US007020502B2

(12) United States Patent
Matsumoto

(10) Patent No.: US 7,020,502 B2
(45) Date of Patent: Mar. 28, 2006

(54) TRANSMITTER FOR REMOTE CONTROL SYSTEM

(75) Inventor: Munenori Matsumoto, Kariya (JP)

(73) Assignee: Denso Corporation, Kariya (JP)

(*) Notice: Subject to any disclaimer, the term of this patent is extended or adjusted under 35 U.S.C. 154(b) by 147 days.

(21) Appl. No.: 10/814,133

(22) Filed: Apr. 1, 2004

(65) Prior Publication Data

US 2004/0204186 A1 Oct. 14, 2004

(30) Foreign Application Priority Data

Apr. 10, 2003 (JP) ............................ 2003-106976

(51) Int. Cl.
*H04B 1/38* (2006.01)

(52) U.S. Cl. ................ 455/574; 455/186.1; 455/343.1; 455/343.5; 455/343.6; 455/420; 455/419; 380/262; 380/273; 340/5.26; 340/825.72

(58) Field of Classification Search ................ 455/574, 455/186.1, 343.1, 343.45, 343.6, 420, 419; 380/262, 273; 340/5.26, 825.72; 324/433
See application file for complete search history.

(56) References Cited

U.S. PATENT DOCUMENTS

| | | | | |
|---|---|---|---|---|
| 5,774,065 | A * | 6/1998 | Mabuchi et al. | 340/825.72 |
| 5,949,349 | A * | 9/1999 | Farris et al. | 340/5.26 |
| 5,952,933 | A * | 9/1999 | Issa et al. | 340/5.26 |
| 6,026,165 | A * | 2/2000 | Marino et al. | 380/273 |
| 6,154,544 | A * | 11/2000 | Farris et al. | 380/262 |
| 6,263,197 | B1 * | 7/2001 | Shibagaki et al. | 455/186.1 |

* cited by examiner

*Primary Examiner*—Joseph Feild
*Assistant Examiner*—David Q. Nguyen
(74) *Attorney, Agent, or Firm*—Posz Law Group, PLC

(57) ABSTRACT

A transmitter has a dummy load circuit. The dummy load circuit is driven prior to writing of a rolling code into a memory. It consumes the amount of power corresponding to the amount of power consumed during the writing of the rolling code. The dummy load circuit monitors the condition of decrease in the source voltage of a battery. If the source voltage becomes lower than a predetermined reset voltage, the dummy load circuit resets the transmission data generation controller. With this operation, a wrong rolling code is not written into the memory.

3 Claims, 4 Drawing Sheets

TRANSMITTER FOR REMOTE CONTROL SYSTEM

CROSS REFERENCE TO RELATED APPLICATION

This application is based on and incorporates herein by reference Japanese Patent Application No. 2003-106976 filed on Apr. 10, 2003.

FIELD OF THE INVENTION

The present invention relates to a transmitter used for a remote control system such as a wireless door lock control system for a vehicle.

BACKGROUND OF THE INVENTION

A transmitter for a known vehicular wireless door lock control system is proposed in U.S. Pat. No. 6,263,197 (JP-A-8-303078). The transmitter has an integral memory for storing a code (rolling code) for counting the number of times that a key operation section is operated. The rolling code is incremented every time the key operation section is operated, and the incremented rolling code is written into a memory. The transmitter generates transmission data including its unique ID code, the rolling code stored in the memory, and instruction data corresponding to instruction information obtained from the key operation section and transmits it. The reason why the rolling code is included in the transmission data is to prohibit a release of the door lock of the vehicle when the transmission data is intercepted by a malicious person and copied data is transmitted to release the door lock.

The transmitter is normally powered by a button battery. Therefore, a source voltage decreases as the battery drains along with the use of the transmitter. In the transmitter, the processes including the increment of the rolling code and the writing of the rolling code into the memory may not be normally performed when the source voltage has decreased.

The transmitter has a rolling code region and a check region in the memory for enabling determination whether the writing of the rolling code is normally performed. The rolling code region and the check region are provided for storing the rolling code and checking for errors in the writing of the rolling code into the rolling code region. A flag in the check region is cleared immediately before the start of the rolling code writing, and the flag in the check region is set immediately after the completion of the rolling code writing.

If the source voltage decreases during the writing of the rolling code into the rolling code region and the rolling code writing process is not normally performed, the flag in the check region remains cleared. Thus, it is determined whether the rolling code is normally written into the rolling code region by checking the level of the flag in the check region.

Because the check region is required in the memory, the amount of memory is increased. Moreover, writing into the check region is performed twice for one key operation. The memory (EEPROM) has limitation on the number of writing that is guaranteed. Therefore, the durability of the memory decreases as the number of writing increases.

SUMMARY OF THE INVENTION

The present invention therefore has an objective to provide a transmitter that can determine whether writing a rolling code into a memory can be normally performed without a check region in the memory.

A transmitter for a remote control system of the present invention includes a battery, a key operation means, a memory, a writing means, a transmission means, a dummy load circuit, and a writing propriety determination means. The battery supplies an operating voltage. The key operation means includes operation keys operated by an operator. The memory stores a rolling code corresponding to a number of times the operation key is operated. The writing means increments the rolling code stored in the memory every time the operation key is operated and writes the incremented rolling code into the memory.

The transmission means transmits a signal including the rolling code stored in the memory to a receiver of the remote control system. The dummy load circuit consumes an amount of power corresponding to an amount of power required for a process of writing the rolling code into the memory by the writing means. The writing propriety determination means drives the dummy load circuit. Then, it determines propriety of writing of the rolling code by the writing means based on a degree of decrease in battery voltage caused by driving the dummy load circuit prior to the writing of the rolling code by the writing means.

The dummy load circuit is driven and the amount of power corresponding to the amount of power consumed during the writing process prior to the writing of the rolling code into the memory. The writing determination means monitors a condition of decrease in the operating voltage of the battery and determines a degree of decrease in the battery voltage.

Namely, if the battery voltage drops below a level at which the writing process is normally performed during the driving of the dummy load circuit, the same voltage drop may occur during the writing process. In such a case, the writing determination means terminates the writing process. With this operation, a wrong rolling code is not written into memory. Because the memory does not have the check region is not provided in the memory, the amount of memory does not increase. Furthermore, the durability of the memory does not decrease because the number of writing is reduced.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiment of the present invention will be explained with reference to the accompanying drawings.

Figure 1A:
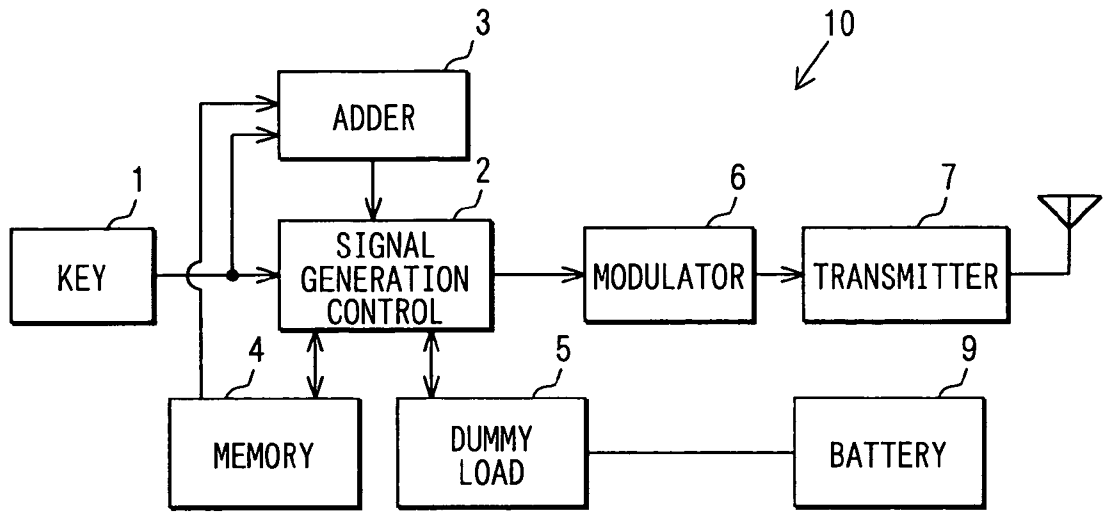
FIG. 1A is a block diagram showing an overall configuration of a transmitter of a door lock control system for a vehicle according to an embodiment of the present invention.

A transmitter for a remote control system of the present invention is applied to a wireless door lock control system for controlling door lock of a vehicle by radio signals. Referring to FIG. 1A, a transmitter 10 includes a key operation circuit 1, a transmission data generation controller 2, an adder 3, a memory (EEPROM) 4, a dummy load circuit 5, a modulator 6, and a transmission circuit 7. The transmitter 10 has an internal battery 9 and operates with operating voltage supplied from the battery 9.

The key operation circuit 1 includes keys for inputting an instruction from a operator for locking or unlocking doors of the vehicle and for unlocking a luggage room door of the vehicle. The key operation circuit 1 receives the instruction inputted from the operator through the key and outputs an operation signal corresponding to the operated key. The controller 2 generates transmission data based on the operation signal outputted from the key operation circuit 1.

In this data generation, a unique ID code of the transmitter 10, and a rolling code stored in the memory 4 are added to the operation signal. As a result, the vehicle is protected from theft even when the transmitting data is intercepted by a malicious person. The ID code and the rolling code may be not only added to the operation signal but also encrypted and then transmitted.

The adder 3 increments the rolling code every time the key operation circuit is operated and outputs the incremented rolling code to the controller 2. The rolling code corresponds to the number of times that the key operation circuit 1 is operated. An updated rolling code is written into the memory 4 every time the rolling code is incremented by the adder 3. As a result, the memory 4 always stores the latest rolling code. The controller 2 and the adder 3 are implemented via software in the same CPU.

The dummy load circuit 5 is driven for a predetermined period so that it consumes the amount of power corresponding to the amount of power required for the writing process. The writing process is a series of operations that includes reading the rolling code from the memory 4, incrementing the rolling code by the adder 3, and writing the rolling code into the memory 4 by the controller 2. The dummy load circuit 5 is started upon a reception of a driving signal from the controller 2 before the execution of the writing process of the rolling code. The modulator 6 is a circuit that modulates the transmission data generated by the controller 2 according to a predetermined rule. The transmission circuit 7 is a circuit that transmits the transmission data modulated by the modulator 6.

Figure 1B:
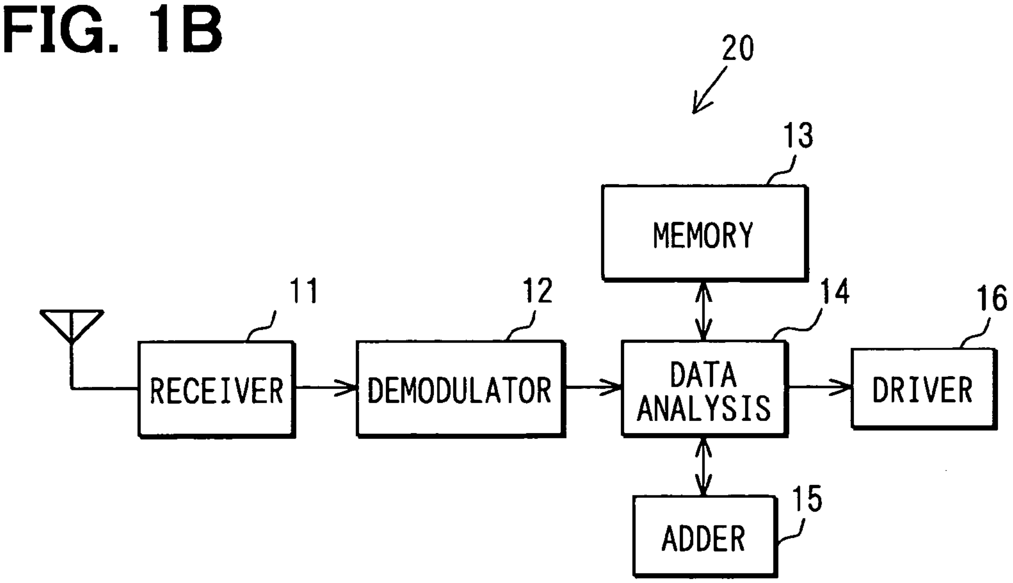
FIG. 1B is a block diagram showing an overall configuration of a vehicle-mounted unit of the door lock control system according to the embodiment.

Referring to FIG. 1B, a vehicle-mounted unit 20 installed in the vehicle includes a receiving circuit 11, a demodulator 12, a memory (EEPROM) 13, a data analysis circuit 14, an adder 15, and a driver 16. It controls locking mechanisms of each door and the luggage room door. The data analysis circuit 14 determines whether the ID code included in the received transmission data has a predetermined relationship with its own ID code, for instance, whether they match. Furthermore, it determines whether the rolling code is larger than the value of the counter that indicates the number of receptions of the transmission data, and whether the received transmission data has transmission errors.

If the results of all the determinations are yes, it is determined that the transmission data has been normally received. The value of the counter that indicates the number of transmission data receptions to be stored in the memory 13 is incremented based on the normal reception of the transmission data. Namely, the count value is read from the memory 13, incremented by the adder 15, and the incremented count value that indicates the number of receptions is written into the memory 13. Furthermore, the data analysis circuit 14 drives the driver 16 to output a control signal for controlling the lock mechanisms based on the operation signals included in the transmission data.

If the rolling code included in the transmission data is larger than the count value, the data analysis circuit 14 drives the adder 15 for converting the count value to the value indicated by the rolling code and incrementing the count value for equalizing them. The data analysis circuit 14 has a function for equalizing the rolling code with the number of the transmission data receptions if the rolling code included in the transmission data is larger than a predicted value.

Figure 2:
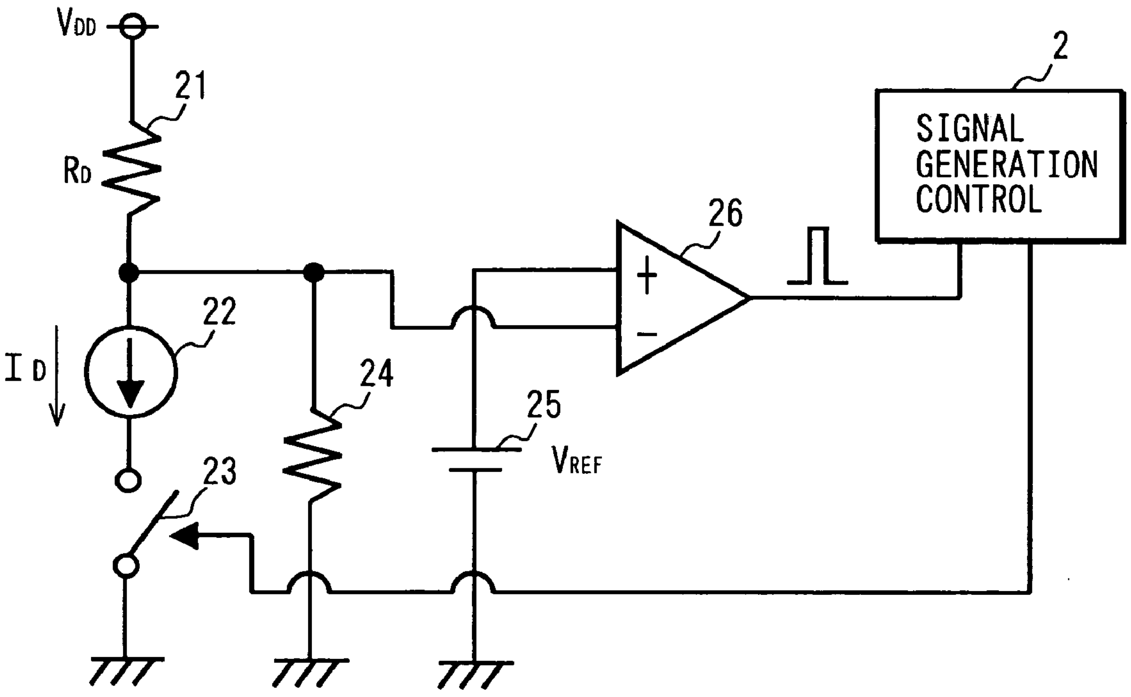
FIG. 2 is a circuit diagram showing a configuration of a dummy load circuit included in the transmitter according to the embodiment.

Referring to FIG. 2, the dummy load circuit 5 includes a constant current circuit 22 that generates constant current $I_D$ and a dummy load resistor 21 through which the constant current $I_D$ generated by the constant current circuit 22 is passed. The dummy load resistor 21 and the constant current circuit 22 form a series circuit. One end of the series circuit is connected with a power supply terminal to which a power supply voltage $V_{DD}$ is supplied from the battery 9. Another end of the series circuit is connected with a ground terminal via a switch 23. The series circuit is driven when the switch 23 is closed by the controller 2 and the constant current $I_D$ is passed through the dummy load resistor 21.

The dummy load resistor 21 has a resistance of $R_D$. The amount of power consumed by the dummy load resistor 21 per unit time is $R_D \cdot (I_D)^2$. The controller 2 closes the switch 2 for a predetermined period so that the amount of power corresponding to the amount of power required for the writing process is consumed by the dummy load circuit 5. It is preferable that an average amount of power consumed per unit time during the writing process and the amount of power consumed by the dummy load circuit 5 per unit time are equally set.

In this case, the driving period of the dummy load circuit 5 can be easily controlled. Namely, the amount of power equal to the amount of power consumed during the writing process is consumed by the dummy load circuit 5 by closing the switch 23 for the same period required for the writing process. The period for closing the switch 23 may be set slightly longer than that of the writing process so that the amount of power consumed by the dummy load circuit 5 is larger than the amount of power consumed during the writing process for ensuring that the operating voltage for the writing process is provided.

A voltage dividing resistor 24 is connected with the dummy load resistor 21. A voltage reduced by the dummy load resistor 21 is inputted to a comparator 26. The voltage dividing resistor 24 has a relatively large resistance and therefore current that passes through it is very small. Thus, the amount of power consumed by the dummy load circuit 5 is substantially equal to the amount of power consumed by the dummy load resistor 21.

A reset voltage $V_{REF}$ is provided by a voltage source 25 as a reference voltage, and the reduced voltage and the reset voltage $V_{REF}$ are inputted to the comparator 26. The comparator 26 compares levels of these two voltages. If the reset voltage $V_{REF}$ is high, a reset signal is outputted from the comparator 26 to the controller 2. The transmitter 10 terminates the writing process or the transmission process based on the operation of the key operation circuit 1, and the key operation performed by the key operation circuit 1 is put in a standby state.

Figure 3:
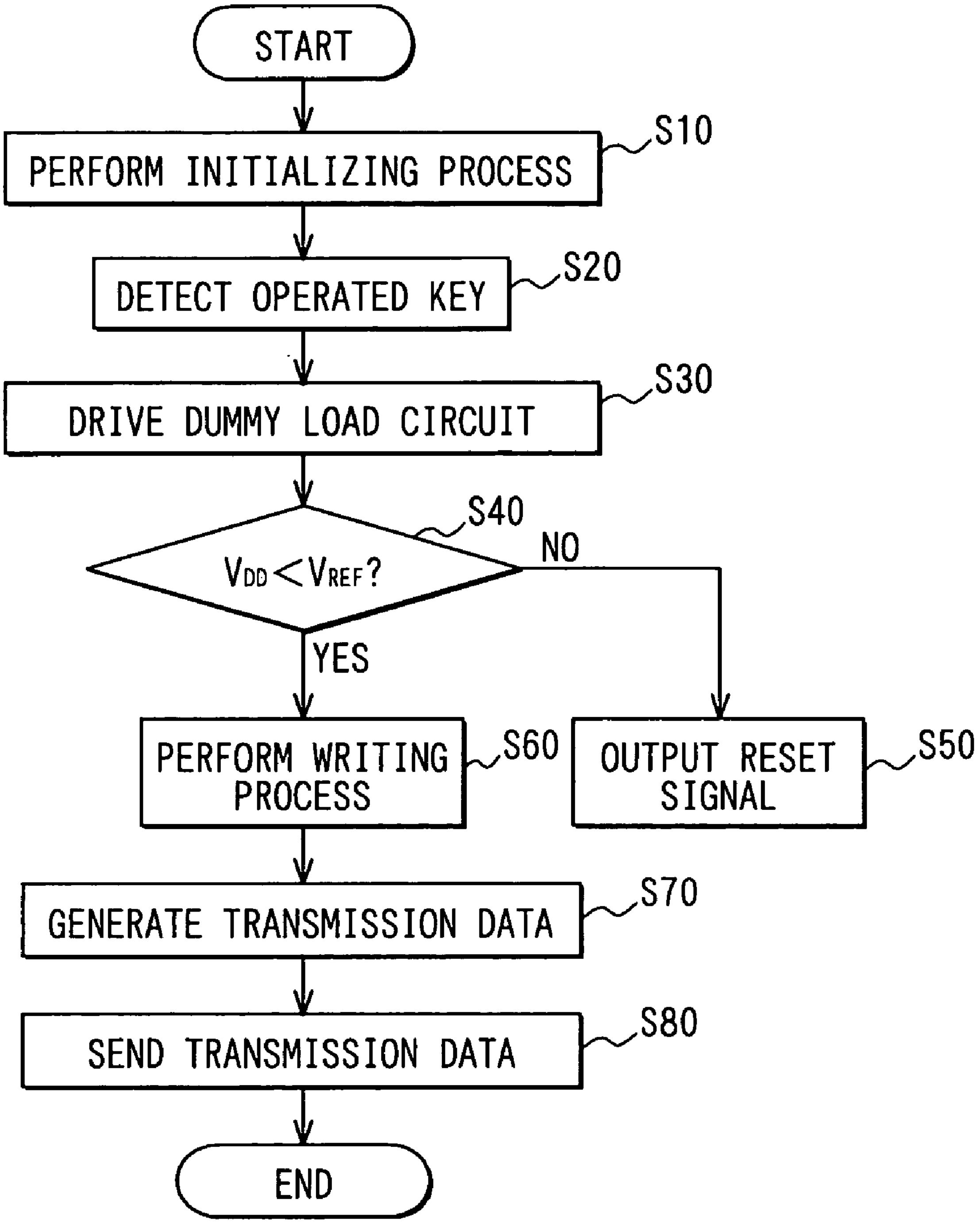
FIG. 3 is a flowchart showing a process performed in the transmitter according to the embodiment.

The process performed in the transmitter 10 to determine the writing propriety will be described referring to a flowchart shown in FIG. 3. The writing propriety determination is performed to judge whether writing of the rolling code by the writing means can be properly performed based on a degree of decrease in battery voltage (source voltage).

The process is started by operating the key operation circuit 1. An initialing process is performed (S10). An operated key is detected (S20). The dummy load circuit 5 is driven prior to the writing process of the rolling code (S30). In this step, the switch 23 is closed for the predetermined period. The constant current $I_D$ is passed through the dummy load resistor 21 so that the amount of power corresponding to the amount of power consumed during the writing process is consumed by the dummy load resistor 21.

It is determined whether the source voltage $V_{DD}$ is reduced by driving the dummy load circuit 5 below the reset voltage $V_{REF}$, namely, a level at which the writing process is difficult to be normally performed (S40). During a determination period, which is during the driving period of the dummy load circuit 5, it is determined that the process is continued or reset based on outputs of the dummy load circuit 5. Namely, if the voltage reduced by the dummy load resistor 21 becomes lower than the reset voltage $V_{REF}$, a reset signal is outputted to the controller 2 (S50).

If the reset signal is not outputted from the dummy load circuit 5 before the driving period of the dummy load circuit 5 is completed, the processes in the controller 2 or others are continued. In this case, a series of writing process is performed (S60). The series of writing process includes reading the rolling code stored in the memory 4 by the controller 2 and the adder 3, incrementing the rolling code, and writing the rolling code into the memory 4. Then, the transmission date is generated by adding the ID code and the rolling code to an operation signal (S70), and the transmission data is transmitted (S80).

Figure 4:
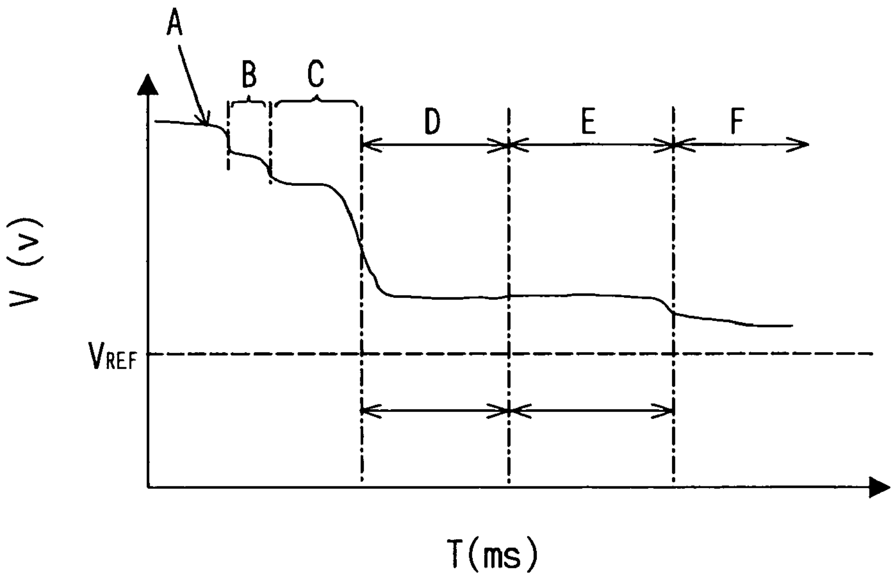
FIG. 4 is a time chart showing an example of operation of the transmitter under the condition that the source voltage is normally provided by a battery according to the embodiment.
Figure 5:
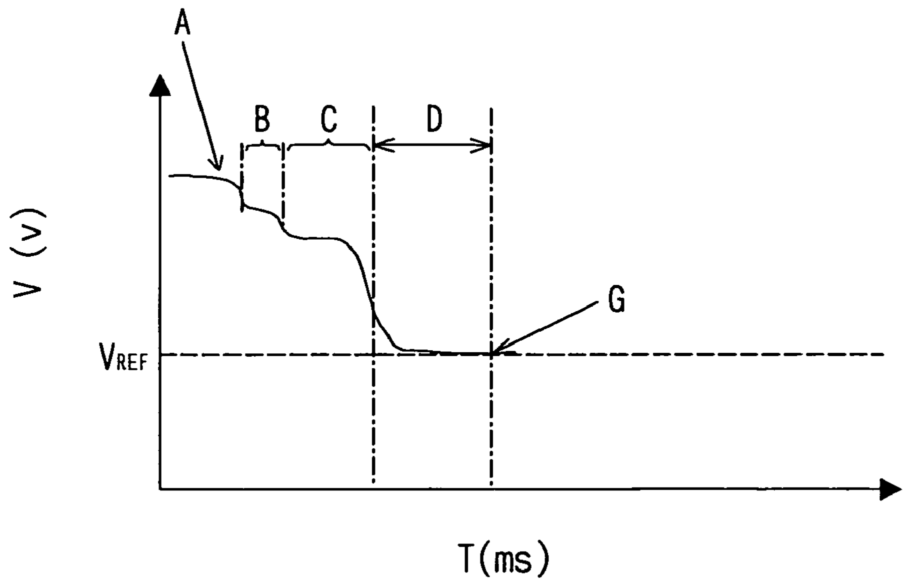
FIG. 5 is a time chart showing an example of operation of the transmitter under the condition that the source voltage provided by the battery is low according to the embodiment.

Next, operations in the case that the source voltage $V_{DD}$ of the battery 9 is normal and in the case that the source voltage $V_{DD}$ is low are discussed referring to time charts shown in FIGS. 4 and 5. As shown in FIG. 4, when the process is started by the key operation (period A), power is consumed by the controller 2 or others and therefore the source voltage $V_{DD}$ slightly drops (period B). However, the process is continued if the source voltage $V_{DD}$ drops to the reset voltage level by the initialization process (period B), the operated key detection process (period C), and the driving of the dummy load circuit 5 (period D). Namely, after the completion of the driving period of the dummy load circuit 5, the writing process of the rolling code into the memory 4 is performed (period E) and then the generation and the transmission of the transmission data are performed (period F).

If the source voltage $V_{DD}$ drops lower than the reset voltage level during the driving period of the dummy load circuit 5 (period D) as shown in FIG. 5, the reset signal is inputted to the controller 2 (time G). As a result, the transmitter 10 terminates the process and puts it on standby until the key operation circuit 1 is operated next time. By using the dummy load circuit 5, the condition of the source voltage $V_{DD}$ in the same situation as the writing process is determined. Therefore, it is properly determined whether the writing process of the rolling code is normally executable although a check region is not set in the memory 4.

If the reset signal is outputted from the dummy load circuit 5, the operation corresponding to the operation of the operation circuit 1 cannot be performed on the vehicle side even though the operation circuit 1 is operated. In such a case, the operator determines that the battery 9 of the transmitter 10 is exhausted and replaces the battery 9. After the battery 9 is replaced, the rolling code incremented according to the key operation is written into the memory 4 and the operation signal is transmittable to the vehicle-mounted unit.

With the above configuration, the transmitter 10 determines a condition of decrease in the operating voltage of the battery 9 and determines a degree of decrease in the battery voltage through the writing propriety determination. Namely, if the battery voltage drops below the reset voltage $V_{REF}$ during the driving of the dummy load circuit 5, the writing process is terminated. As a result, a wrong rolling code is not written into memory. Because the check region is not provided in the memory, the amount of memory does not increase. Furthermore, the durability of the memory does not decrease since the number of writing is reduced.

By constructing the dummy load circuit 5 with the dummy load resistor 21 and the constant current circuit 22, the power consumption of the dummy load circuit 5 can be easily set. Thus, the durability of the dummy load circuit can be improved. Moreover, the dummy load resistor 21 of the dummy load circuit 5 can be also used for voltage detection. Therefore, the overall configuration is simplified.

The present invention should not be limited to the embodiment previously discussed and shown in the figures, but may be implemented in various ways without departing from the spirit of the invention. For example, the present invention can be applied to a vehicle-mounted unit of a remote control system other than the door lock control system or a remote control system other than the vehicle-mounted unit.

The controller 2 may determine the condition of decrease in the source voltage $V_{DD}$ by directly obtaining the source voltage $V_{DD}$ converted from analog to digital during the driving period of the dummy load circuit 5. Furthermore, the load circuit may have other configurations as long as it consumes the same amount of power required for the process of writing to the memory 4.

What is claimed is:

1. A transmitter for a remote control system comprising:

a battery that supplies an operating voltage;

an key operation means that receives an instruction from an operator;

a memory that stores a rolling code corresponding to a number of times the key operation means is operated;

a writing means that increments the rolling code stored in the memory every time the key operation means is operated and writes the incremented rolling code into the memory;

a transmission section that transmits a signal including the rolling code stored in the memory to a receiver of the remote control system;

a dummy load circuit that consumes an amount of power corresponding to an amount of power required for a process of writing the rolling code into the memory by the writing means; and a writing propriety determination means that drives the dummy load circuit and determines propriety of writing of the rolling code by the writing means based on a degree of decrease in battery voltage caused by driving the dummy load circuit prior to the writing of the rolling code by the writing means.

2. The transmitter for a remote control system according to claim 1, wherein:

the dummy load circuit includes a constant current circuit that generates constant current and a resistor through which the constant current generated by the constant current circuit is passed; and the dummy load circuit consumes the amount of power corresponding to the amount of power required for the process of writing the rolling code into the memory when the constant current is passed through the resistor.

3. The transmitter for a remote control system according to claim 2, wherein the writing propriety determination means compares the voltage reduced by the resistor with a predetermined threshold voltage, and terminates the writing process performed by the writing means if the reduced voltage is lower than the predetermined threshold voltage.

* * * * *